US008705414B2

(12) United States Patent
Sung et al.

(10) Patent No.: US 8,705,414 B2
(45) Date of Patent: Apr. 22, 2014

(54) METHOD FOR TRANSMITTING AND RECEIVING DATA IN WIRELESS COMMUNICATION SYSTEM

(75) Inventors: Doo Hyun Sung, Anyang-si (KR); Jin Sam Kwak, Anyang-si (KR); Yong Ho Kim, Anyang-si (KR); Young Soo Yuk, Anyang-si (KR)

(73) Assignee: LG Electronics Inc., Seoul (KR)

( * ) Notice: Subject to any disclaimer, the term of this patent is extended or adjusted under 35 U.S.C. 154(b) by 228 days.

(21) Appl. No.: 13/259,989

(22) PCT Filed: Oct. 7, 2009

(86) PCT No.: PCT/KR2009/005720
§ 371 (c)(1),
(2), (4) Date: Sep. 23, 2011

(87) PCT Pub. No.: WO2010/110513
PCT Pub. Date: Sep. 30, 2010

(65) Prior Publication Data
US 2012/0014296 A1    Jan. 19, 2012

Related U.S. Application Data

(60) Provisional application No. 61/163,458, filed on Mar. 26, 2009, provisional application No. 61/169,205, filed on Apr. 14, 2009.

(51) Int. Cl.
*H04J 3/02* (2006.01)
*H04W 28/12* (2009.01)
*H04L 12/26* (2006.01)
*G08C 25/02* (2006.01)
*H04L 1/14* (2006.01)

(52) U.S. Cl.
USPC ........... 370/280; 370/252; 370/236; 370/329; 370/337; 455/69; 455/450; 714/748; 714/750

(58) Field of Classification Search
USPC ......... 370/236, 252, 280–281, 328, 329–330, 370/294–295
See application file for complete search history.

(56) References Cited

U.S. PATENT DOCUMENTS

| 8,335,165 | B2 * | 12/2012 | Shen et al. ............... 370/252 |
| 2005/0152350 | A1 | 7/2005 | Sung et al. |
| 2005/0201325 | A1 | 9/2005 | Kang et al. |
| 2007/0058595 | A1 | 3/2007 | Classon et al. |
| 2009/0279458 | A1 * | 11/2009 | Shen et al. ............... 370/280 |
| 2009/0323564 | A1 * | 12/2009 | Chiu ............... 370/280 |
| 2010/0165939 | A1 * | 7/2010 | Lin ............... 370/329 |

* cited by examiner

FOREIGN PATENT DOCUMENTS

| KR | 10-0442133 B1 | 7/2004 |
| KR | 10-0612654 B1 | 8/2006 |
| KR | 10-0754658 B1 | 9/2007 |

*Primary Examiner* — Candal Elpenord
(74) *Attorney, Agent, or Firm* — Birch, Stewart, Kolasch & Birch, LLP

(57) ABSTRACT

The present invention relates to a method for transmitting and receiving data in a wireless communication system. The method of transmitting data in a wireless communication system according to an embodiment of the present invention supports time division duplex (TDD), and a base station transmits data to a terminal through a first sub-frame of a first frame and receives a confirmatory response to the data through a second sub-frame of a second frame. The second frame is determined according to hybrid automatic retransmit request (HARQ) processing latency which is the minimal required time from the reception of the data to the transmission of the confirmatory response by the first frame and the terminal. The second sub-frame is determined according to both the first sub-frame and the numbers of the downlink and uplink sub-frames of the first frame, wherein the downlink and uplink sub-frames are respectively used in the HARQ operation.

10 Claims, 14 Drawing Sheets

Related Art

US 8,705,414 B2

METHOD FOR TRANSMITTING AND RECEIVING DATA IN WIRELESS COMMUNICATION SYSTEM

This application is the National Phase PCT/KR2009/005720 filed on Oct. 7, 2009, which claims priority under 35 U.S.C. 119(e) to U.S. Provisional Application No. 61/163,458 filed on Mar. 26, 2009 and Provisional Application No. 61/169,205 filed on Apr. 14, 2009. The entire contents of all of the above applications are hereby incorporated by reference.

TECHNICAL FIELD

The present invention relates to a wireless communication system, and more particularly, to a method of transmitting and receiving data in a wireless communication system.

BACKGROUND ART

In an Institute of Electrical and Electronics Engineers (IEEE) 802.16e system, a Hybrid Automatic Retransmit Request (HARQ) operation is performed in frame units, acknowledgement/negative acknowledgement (ACK/NACK) delay for a HARQ burst is set to one value, and ACK/NACK delay is transmitted through a Downlink Channel Descriptor (DCD) or an Uplink Channel Descriptor (UCD).

In contrast, in an IEEE 802.16m system, one frame may be divided into n subframes and a HARQ operation may be performed in subframe units. Delay which is minimally required by a mobile station (MS) and a base station (BS) occurs when the HARQ operation is performed.

First, delay associated with a downlink HARQ operation will be described with reference to FIG. 1. FIG. 1 is a diagram showing a downlink HARQ operation.

In FIG. 1, $D_{DL\_a}$ denotes a minimal time required for transmitting ACK/NACK for a downlink HARQ burst to a BS after an MS receives the downlink HARQ burst from the BS, and $D_{DL\_b}$ denotes a minimal time required for transmitting new data or retransmitting a downlink HARQ burst after the BS receives ACK or NACK from the MS.

That is, in the downlink HARQ operation, the MS receives the downlink HARQ burst from the BS and then transmits ACK/NACK to the BS through an uplink subframe after $D_{DL\_a}$. The BS receives ACK/NACK, transmits new data if ACK is received through a subframe after $D_{DL\_b}$, and retransmits the downlink HARQ burst if NACK is received.

Next, delay associated with an uplink HARQ operation will be described with reference to FIG. 2. FIG. 2 is a diagram showing the uplink HARQ operation.

In FIG. 2, $D_{UL\_a}$ denotes a minimal time required for generating and transmitting a HARQ burst after an MS receives an uplink A-MAP, $D_{UL\_b}$ denotes a minimal time required for transmitting ACK/NACK for a HARQ burst after the BS receives the HARQ burst from the MS, $D_{UL\_c}$ denotes a minimal time required for transmitting new data or retransmitting a downlink HARQ burst after the MS receives ACK or NACK from the BS. At this time, $D_{UL\_a}$ and $D_{UL\_c}$ may have the same value.

The HARQ operation is basically performed with respect to one HARQ channel in a stop-and-wait manner. That is, until ACK for transmission is received, new transmission is not performed but retransmission is performed.

In addition, minimal delay occurs when transmitting a HARQ burst, receiving ACK/NACK and transmitting new data or retransmitting HARQ burst with respect to one HARQ channel. In order to compensate for such delay, multiple HARQ channels are allocated and used to transmit data. However, if the number of HARQ channels is increased, the total delay of one HARQ channel is increased and delay for successfully transmitting one HARQ burst is increased. Therefore, system performance is deteriorated.

Accordingly, the number of HARQ channels is preferably as small as possible in consideration of delay associated with the HARQ operation. That is, a process of transmitting a HARQ burst, receiving ACK/NACK and transmitting new data or retransmitting HARQ burst with respect to one HARQ channel is performed as soon as possible.

If one frame is divided into a plurality of subframes and a HARQ operation is performed in subframe units, HARQ ACK delay does not have one value as in the IEEE 802.16e system but has different values according to subframes.

For example, ACK/NACK for a downlink HARQ burst transmitted in a b-th downlink subframe of an a-th frame may be transmitted in a c-th uplink subframe of an a-th frame, but ACK/NACK for a downlink HARQ burst transmitted in a (b+1)-th downlink subframe may be transmitted in a d-th uplink subframe of an (a+1)-th frame. Such a situation may occur according to an ACK delay value. Since such a situation occurs, if ACK delay is explicitly set as in the method of the IEEE 802.16e system, significant signaling overhead occurs.

DISCLOSURE

Technical Problem

As described above, if a HARQ operation is performed in subframe units, significant signaling overhead occurs in a data transmission method of the related art.

An object of the present invention is to provide a data transmission method which is able to reduce signaling overhead and reduce a time required for performing a HARQ operation.

The technical problems solved by the present invention are not limited to the above technical problems and those skilled in the art may understand other technical problems from the following description.

Technical Solution

The object of the present invention can be achieved by providing a method for transmitting data at a base station (BS) in a wireless communication system supporting time division duplex (TDD), including transmitting the data to a mobile station (MS) through a first subframe of a first frame, and receiving ACK/NACK for the data from the MS through a second subframe of a second frame, wherein the second frame is determined based on the first frame and Hybrid Automatic Retransmit request (HARQ) processing latency which is a minimal time necessary for transmitting ACK/NACK after the MS receives the data, and wherein the second subframe is determined based on the number of downlink subframes used for a HARQ operation of the first frame, the number of uplink subframes used for the HARQ operation of the first frame, and the first subframe.

According to another aspect of the present invention, there is provided a method for receiving data at a mobile station (MS) in a wireless communication system supporting time division duplexing (TDD), including receiving the data from a base station (BS) through a first subframe of a first frame, and transmitting ACK/NACK for the data to the BS through a second subframe of a second frame, wherein the second frame is determined based on the first frame and Hybrid Automatic Retransmit request (HARQ) processing latency which is a minimal time necessary for transmitting ACK/NACK after the MS receives the data, and wherein the second subframe is determined based on a number of downlink subframes used for a HARQ operation of the first frame, a number of uplink subframes used for the HARQ operation of the first frame, and the first subframe.

At this time, an uplink subframe index in a logical frame of the second subframe may be a maximum integer which does not exceed a value obtained by dividing a product of a downlink subframe index in the logical frame of the first subframe and the number of uplink subframes used for the HARQ operation of the first frame by the number of downlink subframes used for the HARQ operation of the first frame, and the logical frame may be generated by extracting only subframes used for the HARQ operation of the physical frame such that ACK/NACK for the data transmitted through subframe in a specific logical frame is transmitted through the subframe in the specific logical frame.

In addition, the downlink subframe index in the logical frame of the first subframe may be determined based on the subframe index in the physical frame of the first subframe, the number of downlink subframes used for the HARQ operation of the first frame and HARQ processing latency.

According to another aspect of the present invention, there is provided a method for receiving data at a base station (BS) in a wireless communication system supporting time division duplex (TDD), including transmitting an A-MAP IE to a mobile station (MS) through a first subframe of a first frame, and receiving the data from the MS through a second subframe of a second frame, wherein the second frame is determined based on the first frame and a minimal time necessary for transmitting the data after the MS receives the A-MAP IE, and wherein the second subframe is determined based on a number of downlink subframes used for a HARQ operation of the first frame, a number of uplink subframes used for the HARQ operation of the first frame, and the first subframe.

According to another aspect of the present invention, there is provided a method for transmitting data at a mobile station (MS) in a wireless communication system supporting time division duplex (TDD), including receiving an A-MAP IE from a base station (BS) through a first subframe of a first frame, and transmitting the data to the BS through a second subframe of a second frame, wherein the second frame is determined based on the first frame and a minimal time necessary for transmitting the data after the MS receives the A-MAP IE, and wherein the second subframe is determined based on the number of downlink subframes used for a HARQ operation of the first frame, the number of uplink subframes used for the HARQ operation of the first frame, and the first subframe.

At this time, the MS may receive ACK/NACK for the data from the BS through a third subframe of a third frame, and the third subframe may be determined according to the second subframe, the number of uplink subframes used for a HARQ operation of the first frame, and the number of downlink subframes used for the HARQ operation of the first frame.

In addition, a downlink subframe index in a logical frame of the third subframe may be a maximum integer which does not exceed a value obtained by dividing a product of an uplink subframe index in the logical frame of the second subframe and the number of uplink subframes used for the HARQ operation of the first frame by the number of downlink subframes used for the HARQ operation of the first frame, and the logical frame may be generated by extracting only subframes used for the HARQ operation of the physical frame such that ACK/NACK for the data transmitted through subframe in a specific logical frame is transmitted through the subframe in the specific logical frame.

Advantageous Effects

According to the present invention, since a base station (BS) and a mobile station (MS) are aware of transmission times of data and ACK/NACK in advance, it is possible to reduce signaling overhead. In addition, by transmitting data and ACK/NACK through the earliest possible subframe, it is possible to reduce a time required for performing a HARQ operation.

The effects of the present invention are not limited to the above-described effects and other effects which are not described herein will become apparent to those skilled in the art from the following description.

BEST MODE

Figure 1:
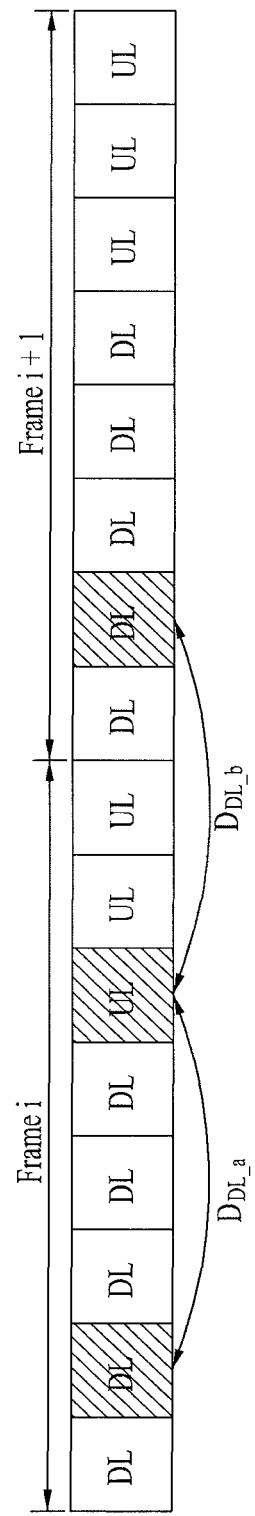
FIG. 1 is a diagram showing a downlink HARQ operation.
Figure 2:
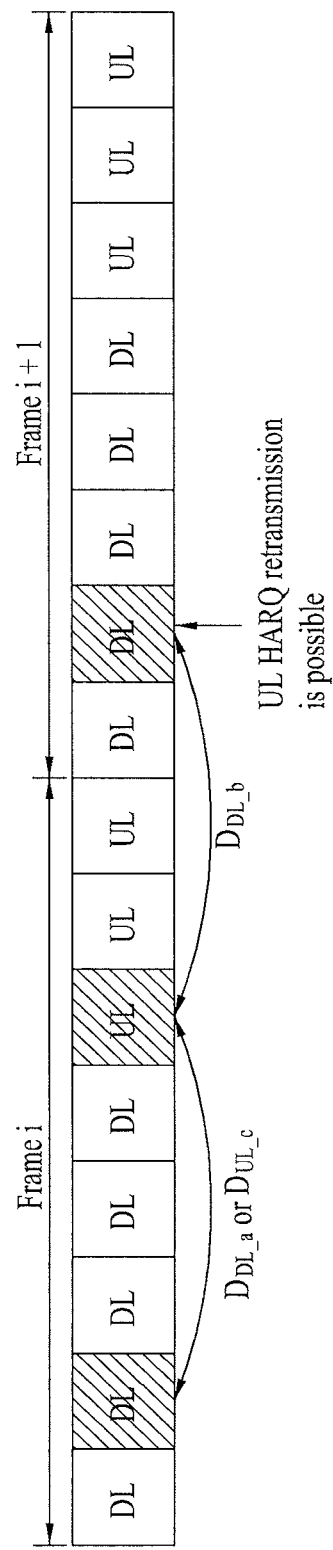
FIG. 2 is a diagram showing an uplink HARQ operation.

Hereinafter, the embodiments of the present invention will be described in detail with reference to the accompanying drawings so as to be easily implemented by those skilled in the art. However, the present invention may be variously implemented and is not limited to the embodiments described herein. In the drawings, in order to clearly describe the present invention, portions which are not related to the description of the present invention will be omitted and similar portions are denoted by similar reference numerals throughout the entire specification.

Throughout the entire specification, when a certain portion "includes" a certain component, this indicates that other components are not excluded, but may be further included unless specially described. The terms "unit", "-or/er" and "module" described in the specification indicate a unit for processing at least one function or operation, which may be implemented by hardware, software and a combination thereof.

Figure 3:
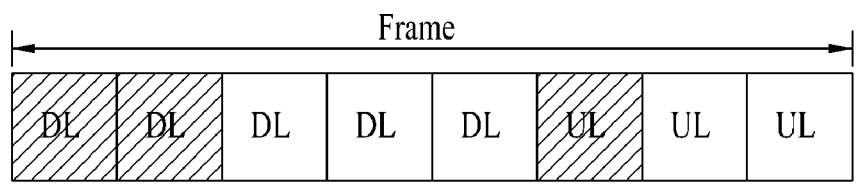
FIG. 3 is a diagram showing an example of the structure of a physical frame.

First, the structure of a physical frame will be described with reference to FIG. 3. FIG. 3 is a diagram showing an example of the structure of a physical frame.

FIG. 3 shows a frame including five downlink subframes and three uplink subframes.

Among subframes included in one frame, there are a subframe in which an advanced MAP information element (A-MAP IE), data and ACK/NACK are transmitted in aspect of a HARQ operation and a subframe is not used for the HARQ operation. FIG. 3 shows the case where one frame includes three downlink subframes used for the HARQ operation and two uplink subframes used for the HARQ operation.

As the subframe which is not used for the HARQ operation, there are a subframe in which a relay zone, an IEEE 802.16e legacy zone and A-MAP cannot be present, a subframe in which a HARQ ACK region cannot be present, etc.

Figure 4:
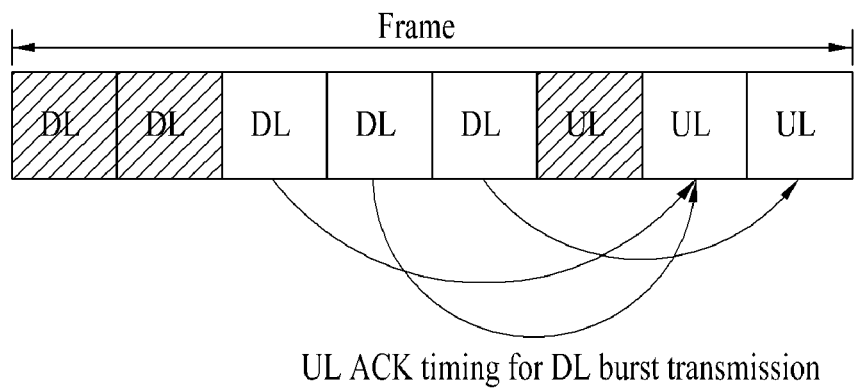
FIG. 4 is a diagram showing an example of an ACK/NACK transmission time for a downlink HARQ burst.

FIG. 4 is a diagram showing an example of an ACK/NACK transmission time for a downlink HARQ burst. FIG. 4 shows an ACK/NACK transmission time without considering ACK delay.

In FIG. 4, the HARQ operation is performed through three downlink subframes and two uplink subframes in one frame, an uplink ACK region in the two uplink subframes is used to transmit ACK/NACK for a HARQ burst transmitted through three downlink subframes, and a downlink ACK region in three downlink subframes is used to transmit ACK/NACK for a HARQ burst transmitted through two uplink subframes.

At this time, ACK/NACK for HARQ bursts transmitted through the same subframe(s) may be transmitted through the same subframe(s). If one HARQ burst is transmitted over a plurality of subframes, HARQ timing may be computed based on a start subframe or a last subframe.

In FIG. 4, ACK/NACK for data transmitted through first and second downlink subframes is transmitted through a first uplink subframe and ACK/NACK for data transmitted through a third downlink subframe is transmitted through a second uplink subframe. A ratio of data transmitted through the downlink subframes to ACK/NACK transmitted through the uplink subframes is 2:1.

Figure 5:
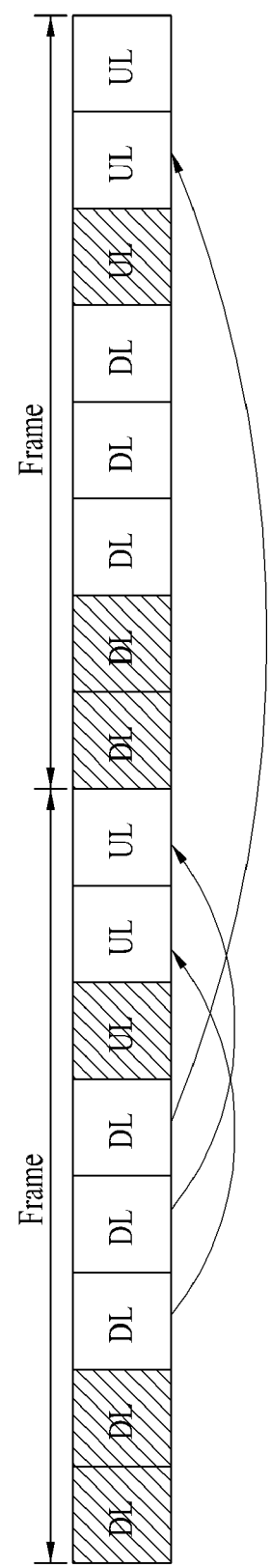
FIG. 5 is a diagram showing an example of an ACK/NACK transmission time for a downlink HARQ burst in case of considering ACK delay.

FIG. 5 is a diagram showing an example of an ACK/NACK transmission time for a downlink HARQ burst in case of considering ACK delay.

Since minimal delay occurs when an MS and a BS perform a HARQ operation, ACK/NACK for data need not be transmitted through a downlink subframe of a frame including a downlink subframe in which data is transmitted.

FIG. 5 shows the case where delay occurs by three subframes in each step of a HARQ operation. In FIG. 5, ACK/NACK for data transmitted through a last downlink subframe is transmitted through a next frame.

Accordingly, in the embodiment of the present invention, a logical frame for HARQ timing is defined separately from a physical frame.

The logical frame is generated by extracting only subframes used for the HARQ operation from among physical frames such that ACK/NACK for data transmitted through subframe(s) in a specific logical frame is transmitted through subframe(s) in the specific logical frame.

Figure 6:
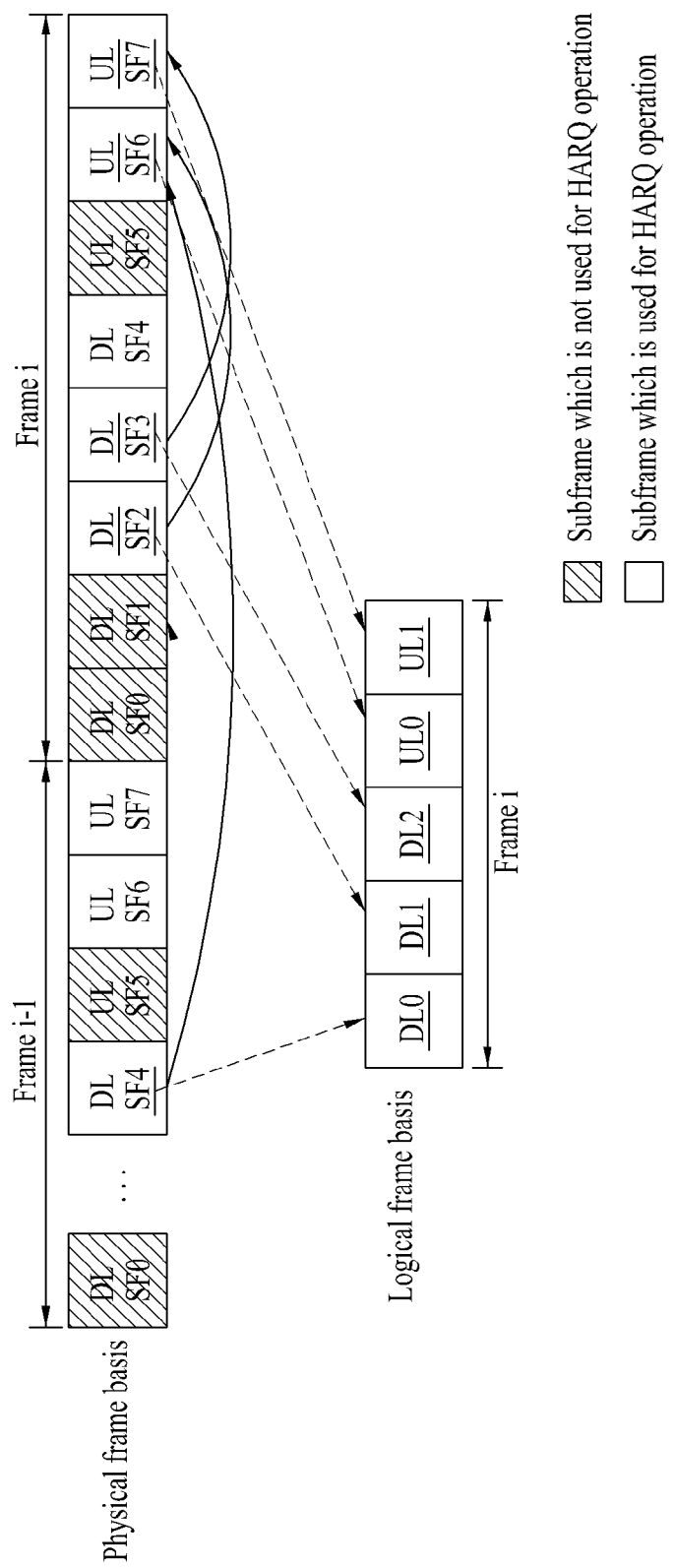
FIG. 6 is a diagram showing a mapping relation between a logical frame and a physical frame.

FIG. 6 is a diagram showing a mapping relation between a logical frame and a physical frame.

If delay occurs by three subframes from a time when an MS receives downlink data to a time when the MS transmits ACK/NACK for the data, as shown in FIG. 6, ACK/NACK for data transmitted through a subframe 4 of an (i−1)-th frame is transmitted through a first uplink subframe among uplink subframes used for the HARQ operation of an i-th frame and ACK/NACK for data transmitted through a subframe 2 of the i-th frame is transmitted through a first uplink subframe among the uplink subframes used for the HARQ operation of the i-th frame, and ACK/NACK for data transmitted through a subframe 3 of the i-th frame is transmitted through a second uplink subframe among the uplink subframes used for the HARQ operation of the i-th frame.

Accordingly, if one logical frame is configured by collecting the subframe 4 of the (i−1)-th frame, the subframe 2 of the i-th frame, the subframe 3 of the i-th frame and the uplink subframes used for the HARQ operation of the i-th frame, ACK/NACK for data transmitted through the subframe in the logical frame is transmitted through the subframes in the logical frame.

In FIG. 6, a ratio of data transmitted through the downlink subframes of the logical frame to ACK/NACK transmitted through the uplink subframes is 2:1.

The index of the uplink subframe and the index of the downlink subframe of the logical frame are shown Equation 1.

$$n'_{DL}\text{: logical downlink subframe index,}$$
$$0<=n'_{DL}<N_{A\text{-}DL}$$

$$n'_{UL}\text{: logical uplink subframe index, } 0<=n'_{UL}<N_{A\text{-}UL} \quad \text{Equation 1}$$

where, $N_{A\text{-}DL}$ denotes the number of downlink subframes used for the HARQ operation of the physical frame and $N_{A\text{-}UL}$ denotes the number of uplink subframes used for the HARQ operation of the physical frame.

The mapping relation between the physical frame and the logical frame may be changed according to the HARQ associated delay value.

Next, a data transmission method according to an embodiment of the present invention in case of each of downlink HARQ and uplink HARQ will be described.

First, variables used in the embodiment of the present invention will be described.

$N_{sf}$ denotes the number of subframes in a physical frame, and $N_{proc}$ denotes HARQ processing latency. HARQ processing latency represents a minimal time necessary for transmitting ACK/NACK after the MS receives data, a minimal time necessary for transmitting data when the MS receives an A-MAP, and a minimal time necessary for transmitting ACK/NACK after the BS receives data. In the embodiment of the present invention, it is assumed that all the minimal time necessary for transmitting ACK/NACK after the MS receives data, the minimal time necessary for transmitting data when the MS receives the A-MAP and the minimal time necessary for transmitting ACK/NACK after the BS receives data are the same.

$n_{A\text{-}DL\_Start}$ denotes a physical subframe index of a start subframe among $N_{A\text{-}DL}$ subframes, $n_{A\text{-}DL\_last}$ denotes a physical subframe index of a last subframe from among $N_{A-DL}$ subframes, $N_{A-UL\_Start}$ denotes a physical subframe index of a start subframe among $N_{A-UL}$ subframes, and $n_{A-UL\_last}$ denotes a physical subframe index of a last subframe of among $N_{A-UL}$ subframes.

$n_{UL\_retx}$ denotes a physical subframe index of a subframe in which HARQ retransmission is performed, m denotes the index of a frame in which downlink data or an A-MAP IE is transmitted, and $m_{HARQ\_Feedback}$ denotes the index of a frame in which HARQ ACK/NACK is transmitted.

$m_{UL\_tx}$ denotes the index of a frame in which HARQ initial transmission is performed and $m_{UL\_retx}$ denotes the index of a frame in which HARQ retransmission is transmitted.

Next, in case of downlink HARQ when supporting frequency division duplex (FDD), a data transmission method according to the embodiment of the present invention will be described.

In the case where the MS receives data from the BS through a downlink subframe $n_{DL}$ of a frame m, a frame $m_{HARQ\_Feedback}$ and a subframe $n_{UL}$ in which the MS transmits ACK/NACK is expressed by Equation 2.

$$n_{UL} = (n_{DL} + N_{proc} + 1) \bmod N_{sf}$$

$$m_{HARQ\_Feedback} = m + \left\lfloor \frac{n_{DL} + N_{proc} + 1}{N_{sf}} \right\rfloor$$

Equation 2

Next, in case of downlink HARQ when supporting time division duplex (TDD), a data transmission method according to the embodiment of the present invention will be described with respect to FIG. 7.

In the embodiment of the present invention, the MS determines a subframe in which ACK/NACK will be transmitted such that a time required for performing the HARQ operation is reduced and ACK/NACK is uniformly transmitted through subframes.

Figure 7:
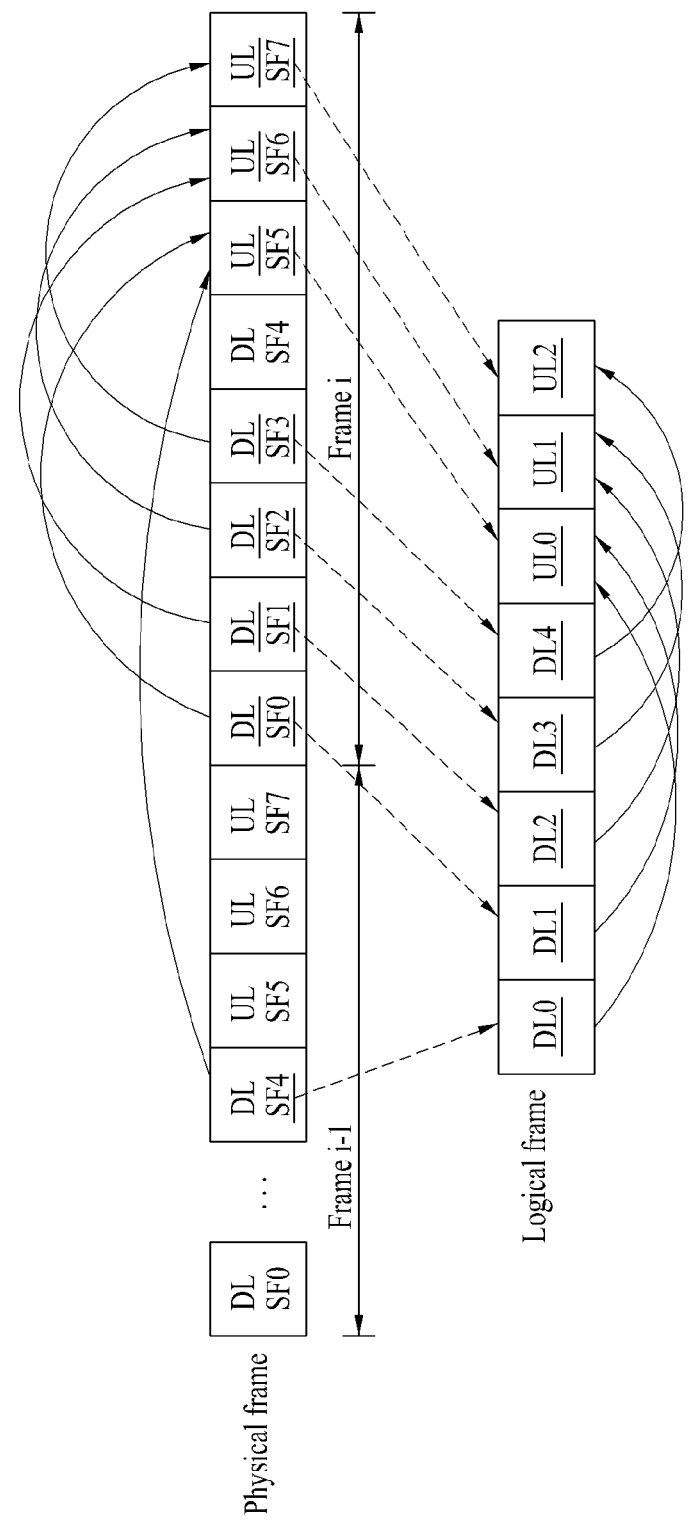
FIG. 7 is a diagram showing a data transmission method according to an embodiment of the present invention, in case of downlink HARQ when $N_{A-DL}$ is equal to or greater than $N_{A-UL}$.

FIG. 7 is a diagram showing a data transmission method according to an embodiment of the present invention, in case of downlink HARQ when $N_{A-DL}$ is equal to or greater than $N_{A-UL}$. FIG. 7 shows the case where $N_{A-DL}$ is 5 and $N_{A-UL}$ is 3. In FIG. 7, a ratio of downlink subframes to uplink subframes is 5:3 and $N_{proc}$ is three subframes.

In FIG. 7, physical uplink subframes used for the HARQ operation of an i-th physical frame are mapped to logical uplink subframes of an i-th logical frame in ascending order and downlink subframes in which ACK may be transmitted through logical uplink subframes of the i-th logical frame are mapped to logical downlink subframes of the i-th logical frame.

When the MS receives data from the BS through specific subframes of a specific frame, the MS transmits ACK/NACK through subframes determined based on subframes in which the data is received and $N_{A-DL}$ and $N_{A-UL}$ of the frame determined based on $N_{proc}$.

If the index of the frame in which the MS receives data is m and the physical subframe index of the subframe is $n_{DL}$, the logical subframe index $n'_{DL}$ of the subframe in which the MS receives data is expressed by Equation 3.

$$n'_{DL} = (n_{DL} + N_{A-DL} - 1 - \min(n_{A-UL\_Last} - N_{proc} - 1, n_{A-DL\_Last})) \bmod N_{A-DL}$$

Equation 3

The logical subframe index $n'_{UL}$ of the subframe in which the MS transmits ACK/NACK for data is expressed by Equation 4.

$$n'_{UL} = \left\lfloor \frac{n'_{DL}}{N_{A-DL}/N_{A-UL}} \right\rfloor$$

Equation 4 where, $\lfloor x \rfloor$ denotes a maximum integer which does not exceed x.

The MS obtains the physical subframe index $n_{UL}$ mapped to $n'_{UL}$ according to the mapping relation between the physical subframe and the logical subframe.

The index $m_{HARQ\_Feedback}$ of the frame in which the MS transmits ACK/NACK for data is expressed by Equation 5.

$$m_{HARQ\_Feedback} = m + \left\lfloor \frac{\min(n_{DL}, n_{A-UL\_Last} - N_{proc} - 1)}{n_{A-UL\_Last} - N_{proc} - 1} \right\rfloor$$

Equation 5

The MS transmits ACK/NACK for data to the BS through subframe $n_{UL}$ of the frame $m_{HARQ\_Feedback}$.

Figure 8:
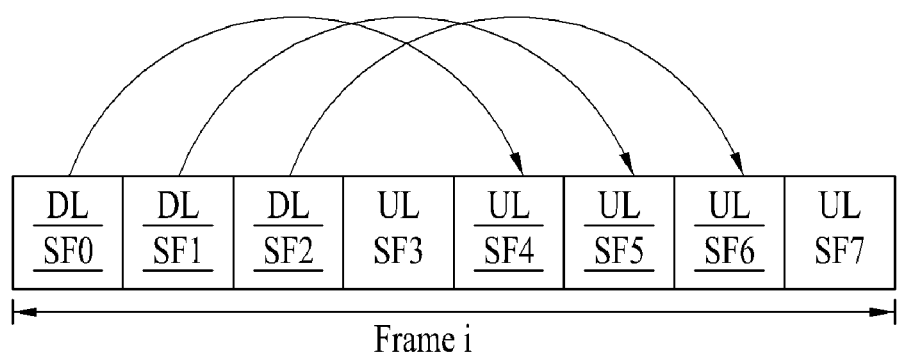
FIG. 8 is a diagram showing a data transmission method according to an embodiment of the present invention, in case of downlink HARQ when $N_{A-DL}$ is less than $N_{A-UL}$.

FIG. 8 is a diagram showing a data transmission method according to an embodiment of the present invention, in case of downlink HARQ when $N_{A-DL}$ is less than $N_{A-UL}$.

If the index of the frame in which the MS receives data is m and the physical subframe index of the subframe is $n_{DL}$, the physical subframe index in which the MS transmits ACK/NACK for the data is expressed by Equation 6 and the index of the frame in which the MS transmits ACK/NACK for the data is expressed by Equation 7.

$$n_{UL} = \max[\min(\hat{n}_{UL}(n_{DL}), n_{A-UL\_Last} + 1) \bmod (n_{A-UL\_Last} + 1), n_{A-UL\_Last} - N_{A-UL\_Last} + 1]$$

$$\hat{n}_{UL}(n_{DL}) = \max(n_{DL} + N_{proc} + 1, n_{A-UL\_Last} - N_{A-UL} + 1)$$

Equation 6

$$m_{HARQ\_Feedback} = m + \left\lfloor \frac{\min(n_{A-DL\_Last} + N_{proc} + 1, n_{A-UL\_Last} + 1)}{n_{A-UL\_Last} + 1} \right\rfloor$$

Equation 7

As shown in FIG. 8, if $N_{A-DL}$ is less than $N_{A-UL}$, the downlink subframes are allocated to the uplink subframes one by one so as to satisfy $N_{proc}$.

Figure 9:
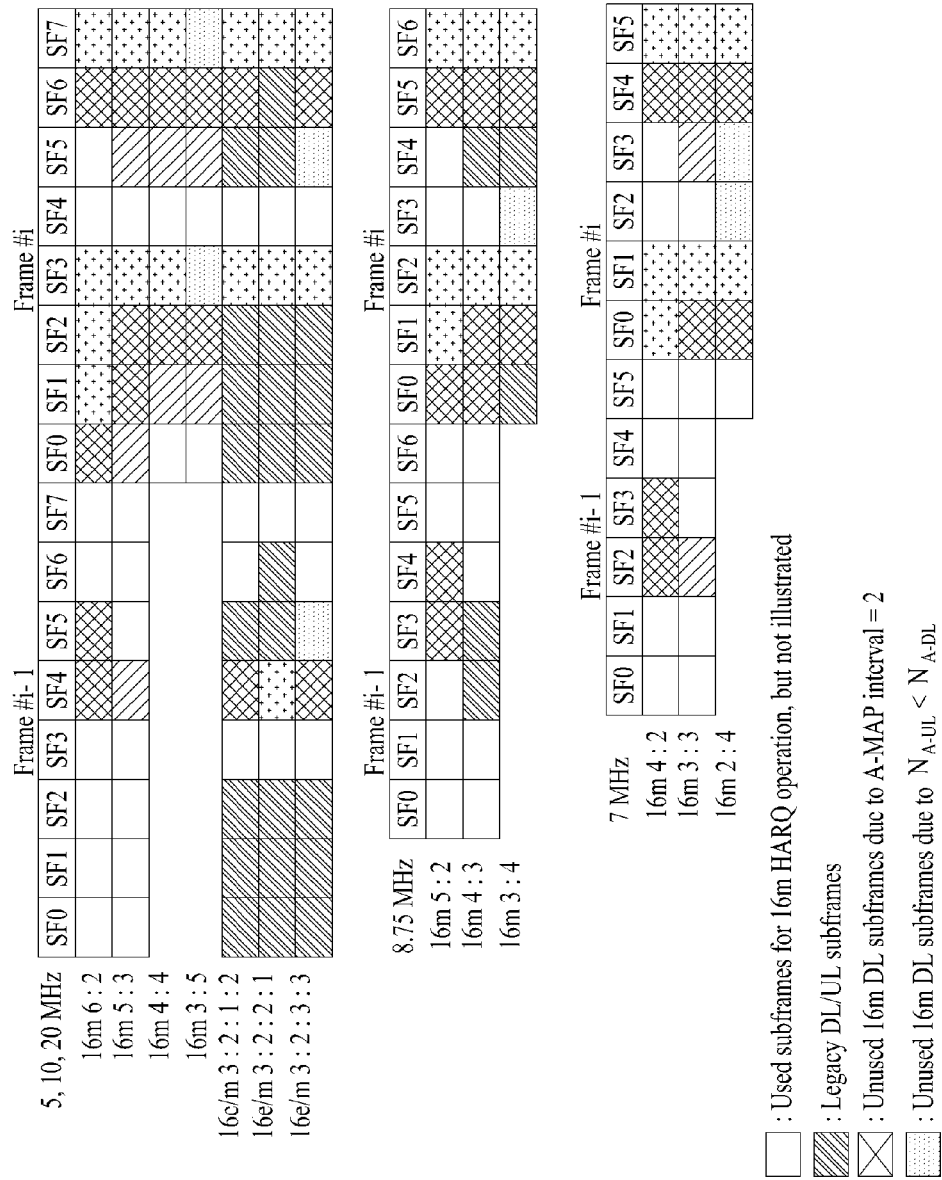
FIG. 9 is a diagram showing a mapping relation between a downlink subframe in which data is transmitted and an uplink subframe in which ACK/NACK is transmitted, in case of downlink HARQ.

FIG. 9 is a diagram showing a mapping relation between a downlink subframe in which data is transmitted and an uplink subframe in which ACK/NACK is transmitted, in case of downlink HARQ.

FIG. 9 shows ratios of downlink subframes to uplink subframes.

In FIG. 9, if the ratio of downlink subframes to uplink subframes is 5:3, ACK/NACK for data transmitted through the subframe 4 of the (i−1)-th frame and the subframe 0 of the i-th frame is transmitted through the subframe 5 of the i-th frame, ACK/NACK for the data transmitted through the subframe 1 and subframe 2 of the i-th frame is transmitted through the subframe 6 of the i-th frame, and ACK/NACK for the data transmitted through the subframe 3 of the i-th frame is transmitted through the subframe 7 of the i-th frame.

Next, in case of uplink HARQ when supporting frequency division duplex (FDD), a data transmission method according to the embodiment of the present invention will be described.

If the MS receives an A-MAP IE from the BS through the downlink subframe $n_{DL}$ of the frame m, the frame $m_{UL\_tx}$ and the subframe $n_{UL}$ in which the MS transmits ACK/NACK is expressed by Equation 8.

$$n_{UL} = (n_{DL} + N_{proc} + 1) \bmod N_{sf}$$ Equation 8

$$m_{UL\_tx} = m + \left\lfloor \frac{n_{DL} + N_{proc} + 1}{N_{sf}} \right\rfloor$$

Next, in case of uplink HARQ when supporting time division duplex (TDD), a data transmission method according to the embodiment of the present invention will be described with reference to FIGS. 10 to 12.

Figure 10:
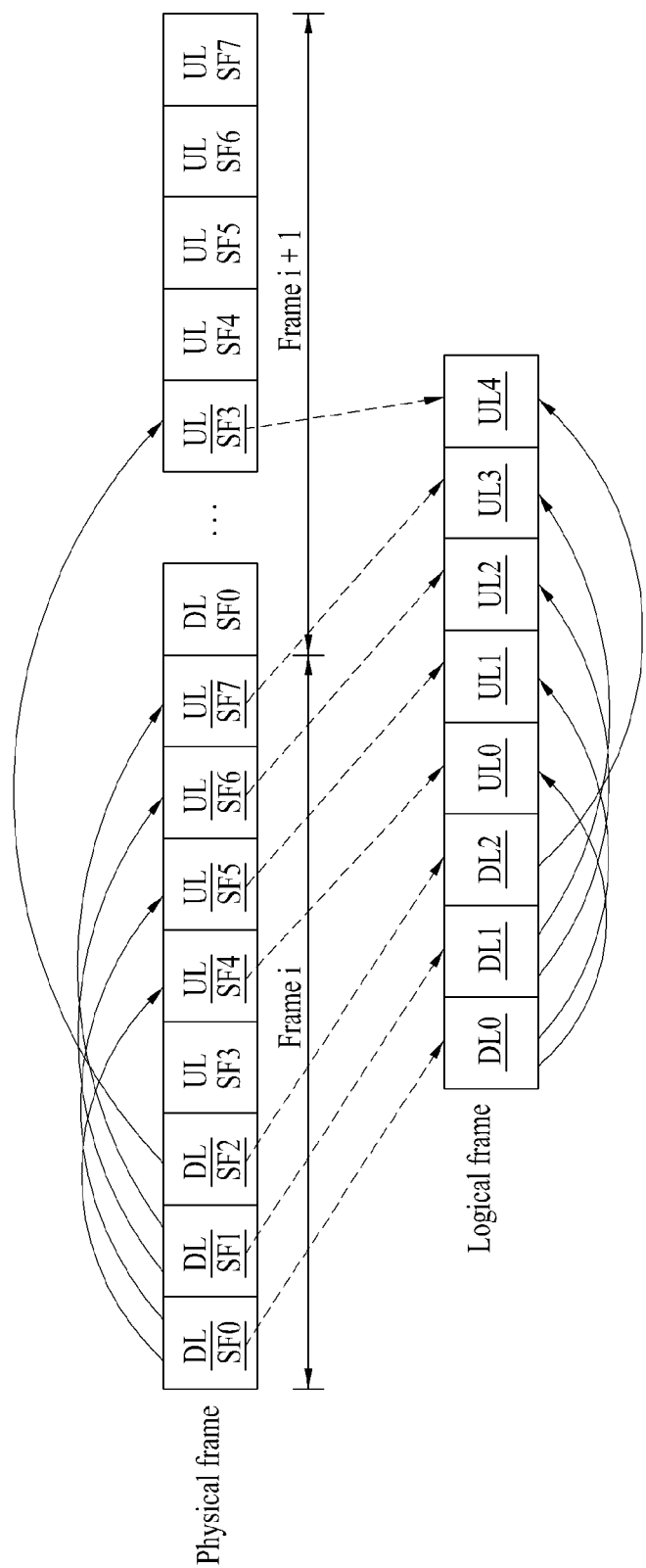
FIG. 10 is a diagram showing a data transmission method according to an embodiment of the present invention, in case of uplink HARQ when $N_{A-UL}$ is greater than $N_{A-DL}$.

FIG. 10 is a diagram showing a data transmission method according to an embodiment of the present invention, in case of uplink HARQ when $N_{A\text{-}UL}$ is greater than $N_{A\text{-}DL}$. FIG. 10 shows the case where $N_{A\text{-}DL}$ is 3 and $N_{A\text{-}UL}$ is 5. In FIG. 10, $N_{proc}$ is three subframes.

In FIG. 10, the mapping relation between the physical frame and the logical frame will be described. First, the downlink subframes used for the HARQ operation of the i-th physical frame are arranged at the logical frames in ascending order. If the physical subframe index of the uplink subframe used for the HARQ operation is $n_{UL}$, the logical subframe index $n'_{UL}$ is expressed by Equation 9.

$$n'_{UL} = (n_{UL} + N_{A\text{-}UL} - \min(\max(n_{A\text{-}UL\_Start}, n_{A\text{-}DL\_Start} + N_{proc} + 1), n_{A\text{-}UL\_Last})) \bmod N_{A\text{-}UL}$$ Equation 9

If the logical subframe index of the downlink subframe in which the MS receives the A-MAP IE is $n'_{DL}$, the logical subframe index of the uplink subframe in which the MS transmits the data may be obtained by Equation 10.

$$n'_{DL} = \left\lfloor \frac{n'_{UL}}{N_{A-UL}/N_{A-DL}} \right\rfloor$$ Equation 10

The MS may obtain the physical subframe index of the uplink subframe in which the MS transmits the data using the mapping relation between the physical frame and the logical frame.

The index of the frame in which the MS transmits the data is expressed by Equation 11.

$$m_{UL\_tx} = m + \left\lfloor \frac{\min(n_{A-DL\_Start} + N_{proc} + 1, n_{A-UL\_Last})}{n_{A-UL\_Last}} \right\rfloor$$ Equation 11

Figure 11:
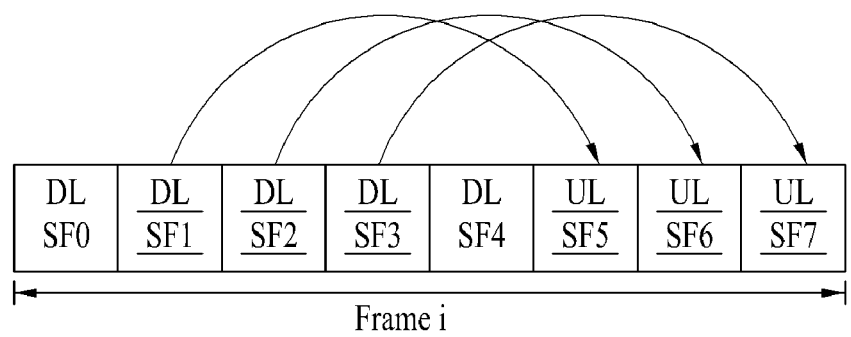
FIG. 11 is a diagram showing a data transmission method according to an embodiment of the present invention, in case of uplink HARQ when $N_{A-UL}$ is less than or equal to $N_{A-DL}$.

FIG. 11 is a diagram showing a data transmission method according to an embodiment of the present invention, in case of uplink HARQ when $N_{A\text{-}UL}$ is less than or equal to $N_{A\text{-}DL}$.

As shown in FIG. 11, the MS transmits data to the BS through an earliest uplink subframe among uplink subframes separated from the downlink subframe, in which the MS receives the A-MAP IE, by $N_{proc}$ or more.

Figure 12:
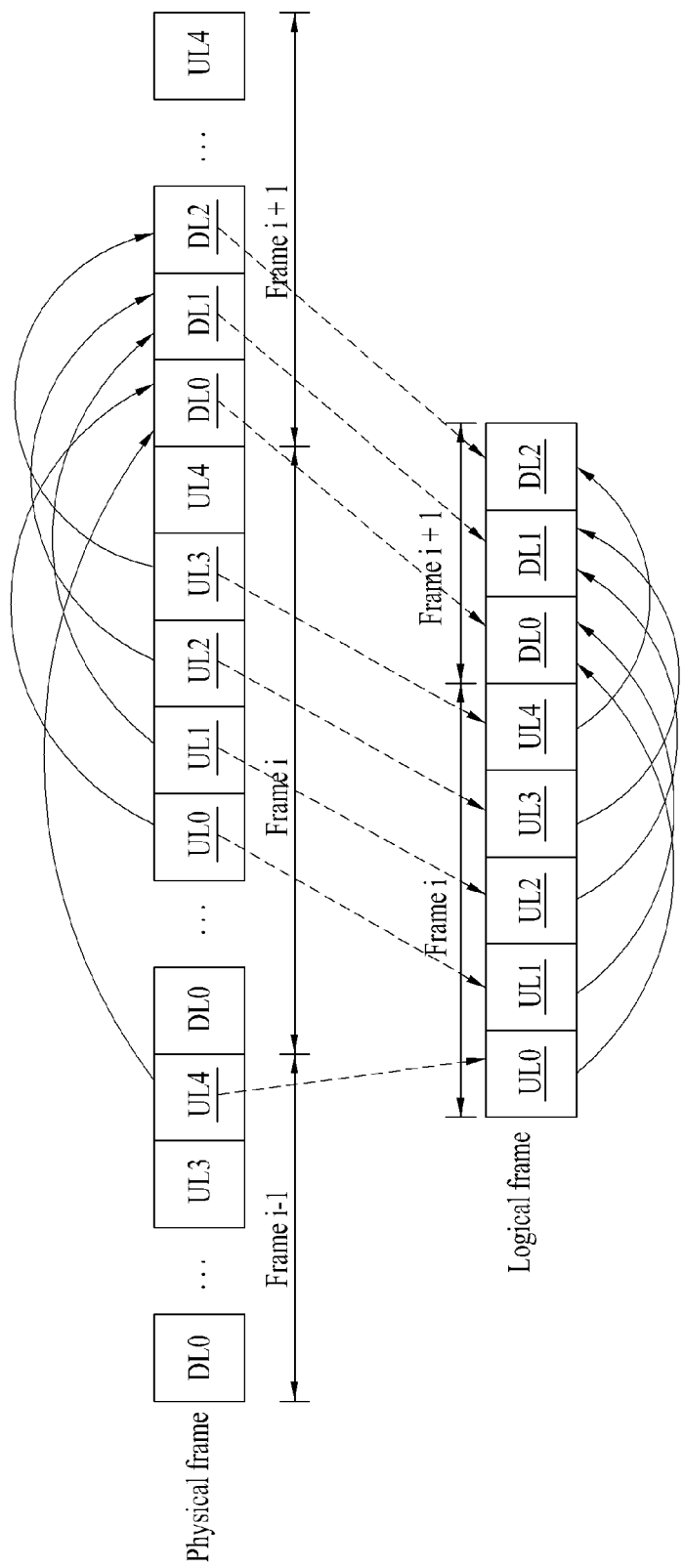
FIG. 12 is a diagram showing an ACK/NACK transmission time according to an embodiment of the present invention in case of uplink HARQ when $N_{A-UL}$ is equal to or greater than $N_{A-DL}$.

FIG. 12 is a diagram showing an ACK/NACK transmission time according to an embodiment of the present invention in case of uplink HARQ when $N_{A\text{-}UL}$ is equal to or greater than $N_{A\text{-}DL}$. FIG. 12 shows the case where the ratio of downlink subframes to uplink subframes is 3:5.

If the logical subframe index of the uplink subframe in which the MS transmits data to the BS is $n'_{UL}$, the logical subframe index $n'_{DL}$ of the downlink subframe in which ACK/NACK is received from the BS is expressed by Equation 12.

$$n'_{DL} = \left\lfloor n'_{UL} / \left\lceil \frac{N_{UL}}{N_{DL}} \right\rceil \right\rfloor$$ Equation 12

In case of uplink HARQ when $N_{A\text{-}UL}$ is equal to or greater than $N_{A\text{-}DL}$, if the logical subframe index of the uplink subframe in which the MS transmits data to the BS is $n'_{UL}$, the logical subframe index $n'_{DL}$ of the downlink subframe in which ACK/NACK is received from the BS is expressed by Equation 13.

$$n'_{DL} = n'_{UL}$$ Equation 13

Figure 13:
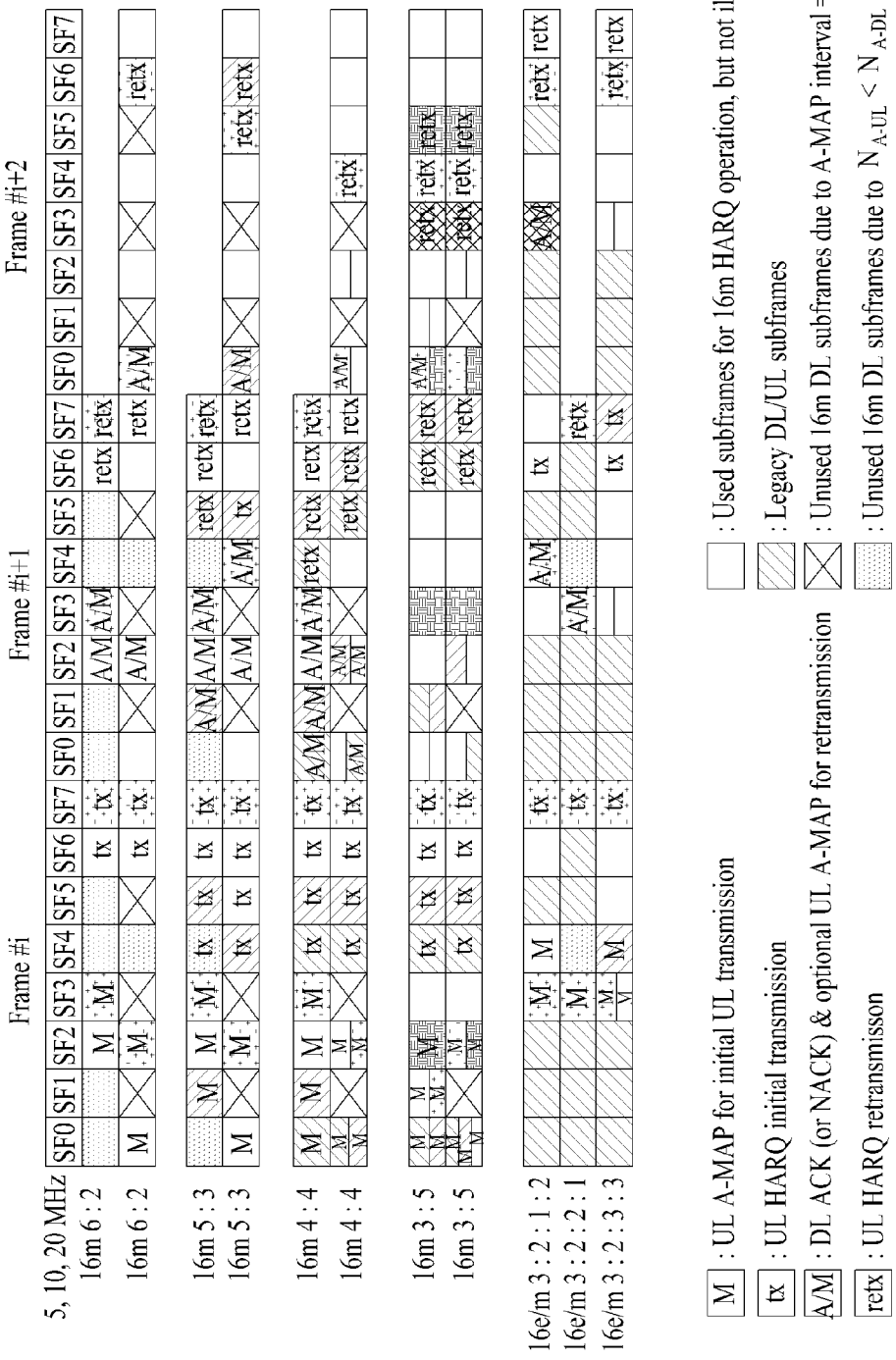
FIG. 13 is a diagram showing an A-MAP IE, data, ACK/NACK and retransmission time according to an embodiment of the present invention in case of downlink HARQ having a bandwidth of 5, 10 or 20 MHz.
Figure 14:
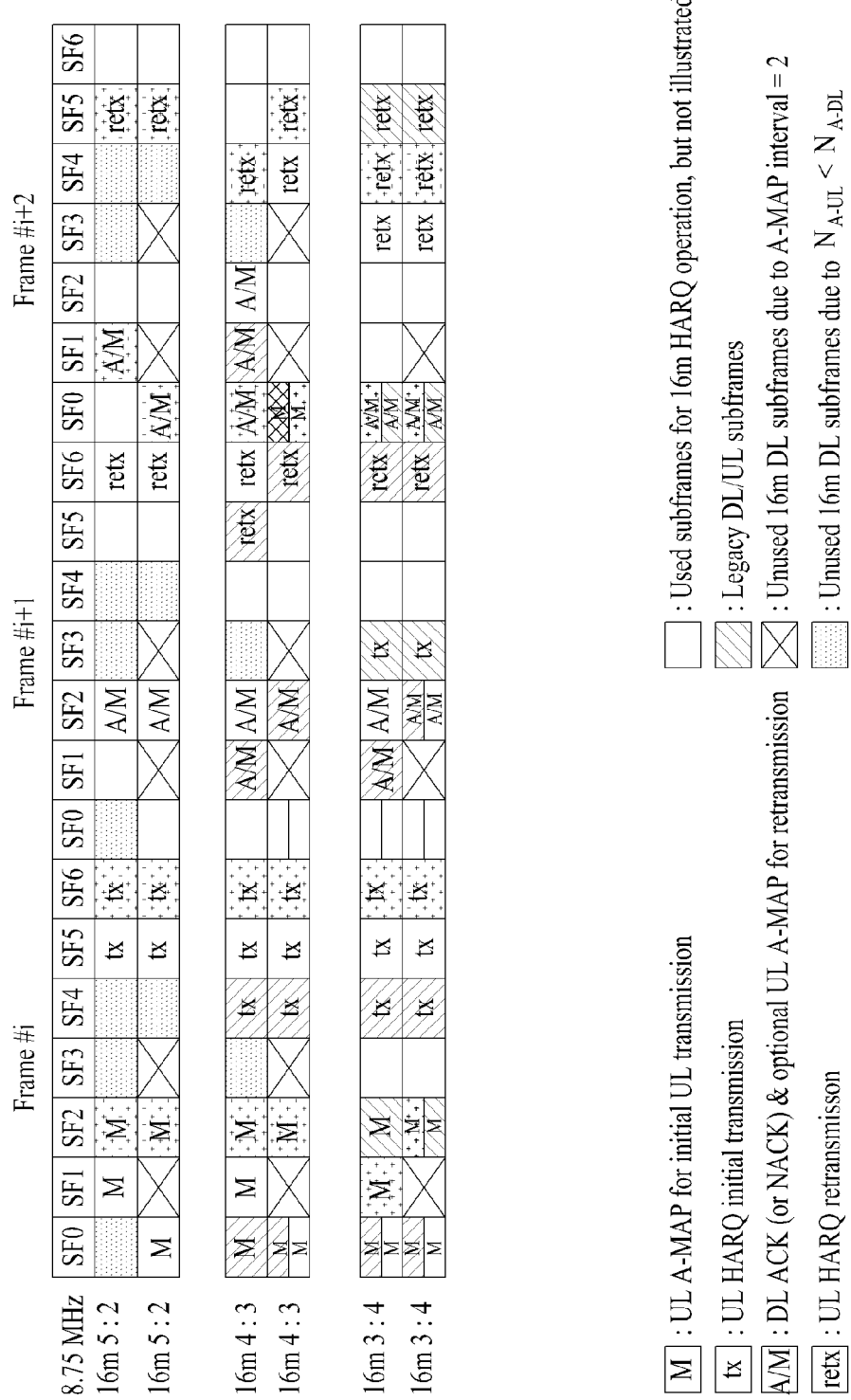
FIG. 14 is a diagram showing an A-MAP IE, data, ACK/NACK and retransmission time according to an embodiment of the present invention in case of downlink HARQ having a bandwidth of 8.75 MHz.
Figure 15:
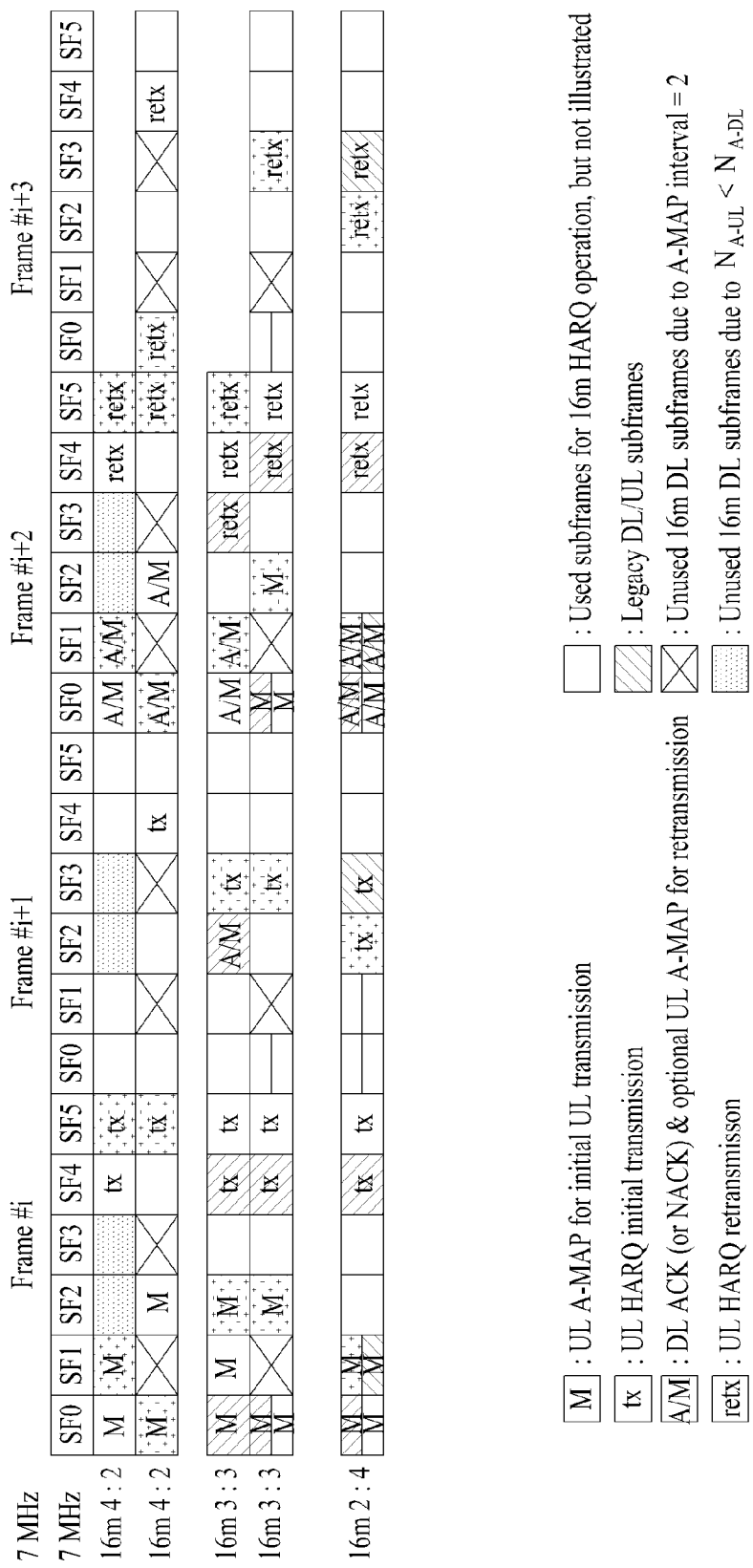
FIG. 15 is a diagram showing an A-MAP IE, data, ACK/NACK and retransmission time according to an embodiment of the present invention in case of downlink HARQ having a bandwidth of 7 MHz.

FIG. 13 is a diagram showing an A-MAP IE, data, ACK/NACK and retransmission time according to an embodiment of the present invention in case of downlink HARQ having a bandwidth of 5, 10 or 20 MHz, FIG. 14 is a diagram showing an A-MAP IE, data, ACK/NACK and retransmission time according to an embodiment of the present invention in case of downlink HARQ having a bandwidth of 8.75 MHz, and FIG. 15 is a diagram showing an A-MAP IE, data, ACK/NACK and retransmission time according to an embodiment of the present invention in case of downlink HARQ having a bandwidth of 7 MHz.

FIGS. 13 to 15 show the ratios of downlink subframes to uplink subframes.

The embodiments of the present invention may be implemented by various parts. For example, the embodiments of the present invention may be implemented by hardware, firmware, software or a combination thereof. In the case of implementing the present invention by hardware, the present invention can be implemented with application specific integrated circuits (ASICs), Digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. For example, the software code may be stored in the memories 780 and 790 so that it can be driven by the processors 720 and 730. The memory units are located inside or outside the processors, so that they can communicate with the aforementioned processors via a variety of well-known parts.

Those skilled in the art will appreciate that the present invention may be carried out in other specific ways than those set forth herein without departing from the spirit and essential characteristics of the present invention. The above exemplary embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

Moreover, it will be apparent that some claims referring to specific claims may be combined with another claims referring to the other claims other than the specific claims to constitute the embodiment or add new claims by means of amendment after the application is filed.

The invention claimed is:

1. A method for receiving ACK (ACKnowledgement)/NACK (Negative-ACKnowledgement) at a Base Station (BS) in a wireless communication system, the method comprising:

transmitting the data to a Mobile Station (MS) through a first subframe of a Time Division Duplex (TDD) frame, wherein the TDD frame includes one or more subframes used for Hybrid-Automatic Repeat reQuest (HARQ) processing and one or more subframes not used for the HARQ processing; and receiving the ACK/NACK for the data from the MS through a second subframe of a TDD frame #i, wherein uplink subframes used for the HARQ processing in the TDD frame #i are mapped to logical uplink subframes of a logical frame, wherein downlink subframes corresponding to the uplink subframes are mapped to logical downlink subframes of the logical frame, and wherein a logical uplink subframe index $n_{UL}$ corresponding to a second subframe in the logical frame is determined by the following equation A:

$$n_{UL} = \left\lfloor n_{DL} \left\lceil \frac{N_{DL}}{N_{UL}} \right\rceil \right\rfloor \quad \text{[Equation A]}$$

wherein $n_{DL}$ is a logical downlink subframe index corresponding to a first subframe in the logical frame, $N_{DL}$ is a number of downlink subframes used for the HARQ processing in the TDD frame, $N_{UL}$ is a number of uplink subframes used for the HARQ processing in the TDD frame, $\lfloor \ \rfloor$ is a floor function, and $\lceil \ \rceil$ is a ceiling function.

2. The method according to claim 1, wherein the logical downlink subframe index is determined based on a subframe index in the TDD frame, the number of downlink subframes used for the HARQ processing in the TDD frame and a HARQ processing latency.

3. A method for transmitting ACK (ACKnowledgement)/NACK (Negative-ACKnowledgement) at a Mobile Station (MS) in a wireless communication system, the method comprising:

receiving the data from a Base Station (BS) through a first subframe of a Time Division Duplex (TDD) frame, wherein the TDD frame includes one or more subframes used for Hybrid-Automatic Repeat reQuest (HARQ) processing and one or more subframes not used for the HARQ processing; and transmitting the ACK/NACK for the data to the BS through a second subframe of a TDD frame #i, wherein uplink subframes used for the HARQ processing in the TDD frame #i are mapped to logical uplink subframes of a logical frame, wherein downlink subframes corresponding to the uplink subframes are mapped to logical downlink subframes of the logical frame, and wherein a logical uplink subframe index $n_{UL}$ corresponding to a second subframe in the logical frame is determined by the following equation A:

$$n_{UL} = \left\lfloor n_{DL} \left\lceil \frac{N_{DL}}{N_{UL}} \right\rceil \right\rfloor \quad \text{[Equation A]}$$

wherein $n_{DL}$ is a logical downlink subframe index corresponding to a first subframe in the logical frame, $N_{DL}$ is a number of downlink subframes used for the HARQ processing in the TDD frame, $N_{UL}$ is a number of uplink subframes used for the HARQ processing in the TDD frame, $\lfloor \ \rfloor$ is a floor function, and $\lceil \ \rceil$ is a ceiling function.

4. The method according to claim 3, wherein the logical downlink subframe index is determined based on a subframe index in the TDD frame, the number of downlink subframes used for the HARQ processing in the TDD frame and a HARQ processing latency.

5. A method for receiving data at a base station (BS) in a wireless communication system supporting time division duplex (TDD), the method comprising:

transmitting an A-MAP IE to a mobile station (MS) through a first subframe of a first frame; and receiving the data from the MS through a second subframe of a second frame, wherein the second frame is determined based on the first frame and a minimal time necessary for transmitting the data after the MS receives the A-MAP IE, and wherein the second subframe is determined based on a number of downlink subframes used for a HARQ operation of the first frame, a number of uplink subframes used for the HARQ operation of the first frame, and the first subframe.

6. The method according to claim 5, further comprising:

transmitting ACK/NACK for the data to the MS through a third subframe of a third frame, wherein the third subframe is determined based on the second subframe, the number of uplink subframes used for a HARQ operation of the first frame, and the number of downlink subframes used for the HARQ operation of the first frame.

7. The method according to claim 6, wherein a downlink subframe index in a logical frame of the third subframe is a maximum integer which does not exceed a value obtained by dividing a product of an uplink subframe index in the logical frame of the second subframe and the number of uplink subframes used for the HARQ operation of the first frame by the number of downlink subframes used for the HARQ operation of the first frame, and the logical frame is generated by extracting only subframes used for the HARQ operation of the physical frame such that ACK/NACK for the data transmitted through subframe in a specific logical frame is transmitted through the subframe in the specific logical frame.

8. A method for transmitting data at a mobile station (MS) in a wireless communication system supporting time division duplex (TDD), the method comprising:

receiving an A-MAP IE from a base station (BS) through a first subframe of a first frame; and transmitting the data to the BS through a second subframe of a second frame, wherein the second frame is determined based on the first frame and a minimal time necessary for transmitting the data after the MS receives the A-MAP IE, and wherein the second subframe is determined based on a number of downlink subframes used for a HARQ operation of the first frame, a number of uplink subframes used for the HARQ operation of the first frame, and the first subframe.

9. The method according to claim 8, further comprising:

receiving ACK/NACK for the data from the BS through a third subframe of a third frame, wherein the third subframe is determined based on the second subframe, a number of uplink subframes used for a HARQ operation of the first frame, and a number of downlink subframes used for the HARQ operation of the first frame.

10. The method according to claim 9, wherein a downlink subframe index in a logical frame of the third subframe is a maximum integer which does not exceed a value obtained by dividing a product of an uplink subframe index in the logical frame of the second subframe and the number of uplink subframes used for the HARQ operation of the first frame by the number of downlink subframes used for the HARQ operation of the first frame, and the logical frame is generated by extracting only subframes used for the HARQ operation of the physical frame such that ACK/NACK for the data transmitted through subframe in a specific logical frame is transmitted through the subframe in the specific logical frame.

* * * * *